US011796801B2

(12) United States Patent
Goldberg et al.

(10) Patent No.: US 11,796,801 B2
(45) Date of Patent: Oct. 24, 2023

(54) REDUCING LIGHT LEAKAGE VIA EXTERNAL GAZE DETECTION

(71) Applicant: GOOGLE LLC, Mountain View, CA (US)

(72) Inventors: Steven Benjamin Goldberg, Los Altos Hills, CA (US); Juston Payne, Woodside, CA (US); Michael Schoenberg, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 29 days.

(21) Appl. No.: 17/303,197

(22) Filed: May 24, 2021

(65) Prior Publication Data

US 2022/0373790 A1    Nov. 24, 2022

(51) Int. Cl.
  *G02B 27/00*   (2006.01)
  *G02B 27/01*   (2006.01)
  *G06F 3/01*    (2006.01)
  *G06F 21/62*   (2013.01)
  *G06F 21/84*   (2013.01)

(52) U.S. Cl.
  CPC ..... *G02B 27/0093* (2013.01); *G02B 27/0172* (2013.01); *G06F 3/013* (2013.01); *G02B 2027/0138* (2013.01); *G02B 2027/0178* (2013.01)

(58) Field of Classification Search
  USPC .......................................................... 345/8
  See application file for complete search history.

(56) References Cited

U.S. PATENT DOCUMENTS

| 2002/0044152 | A1* | 4/2002 | Abbott, III | G02B 27/017 345/629 |
| 2007/0150827 | A1 | 6/2007 | Singh et al. | |
| 2010/0205667 | A1* | 8/2010 | Anderson | G06F 3/017 726/19 |
| 2012/0086624 | A1* | 4/2012 | Thompson | G02B 27/017 345/8 |
| 2013/0114043 | A1* | 5/2013 | Balan | A61B 3/113 351/210 |
| 2013/0335303 | A1* | 12/2013 | Maciocci | G02B 27/017 345/8 |

(Continued)

OTHER PUBLICATIONS

International Search Report and Written Opinion for PCT Application No. PCT/US2022/072535, dated Sep. 9, 2022, 16 pages.

*Primary Examiner* — Chineyere D Wills-Burns
(74) *Attorney, Agent, or Firm* — Brake Hughes Bellermann LLP

(57) ABSTRACT

Techniques of displaying content on a transparent display include detecting an individual present with respect to a world side, i.e., facing away from a user of a transparent display, opposite side of the transparent display as the user side. For example, circuitry connected to smartglasses detects the presence of an individual in the vicinity of the world side of a transparent display. In response, the circuitry causes an image of the individual to be generated and, based on the image, the circuitry classifies the individual as being in a state satisfying a set of criteria or not. In some implementations, the set of criteria include the individual being oriented in such a way as to be able to see the document. In response to the individual satisfying the criteria, the circuitry obscures the document from the view of the individual.

19 Claims, 8 Drawing Sheets

(56) References Cited

U.S. PATENT DOCUMENTS

| | | | |
|---|---|---|---|
| 2014/0075349 A1* | 3/2014 | Yun | G06F 3/0481 |
| | | | 715/764 |
| 2014/0347267 A1* | 11/2014 | Nishi | G06F 3/013 |
| | | | 345/156 |
| 2015/0253573 A1* | 9/2015 | Sako | H04N 13/398 |
| | | | 345/207 |
| 2015/0253930 A1* | 9/2015 | Kozloski | H04N 21/4312 |
| | | | 345/175 |
| 2015/0277599 A1* | 10/2015 | Cho | G06F 3/013 |
| | | | 345/173 |
| 2016/0048220 A1* | 2/2016 | Shen | G02B 27/0172 |
| | | | 345/8 |
| 2016/0191995 A1* | 6/2016 | el Kaliouby | H04N 21/812 |
| | | | 725/12 |
| 2016/0320625 A1* | 11/2016 | von und zu Liechtenstein | |
| | | | G02B 27/0179 |
| 2017/0060512 A1* | 3/2017 | Rakshit | G06F 3/041 |
| 2017/0092002 A1* | 3/2017 | Mullins | G02B 27/0172 |
| 2018/0033171 A1* | 2/2018 | Rakshit | G06V 20/00 |
| 2018/0165857 A1* | 6/2018 | Lee | G06F 3/013 |
| 2018/0180882 A1* | 6/2018 | Tuli | G02B 27/0012 |
| 2018/0217429 A1* | 8/2018 | Busch | G02F 1/076 |
| 2018/0239169 A1* | 8/2018 | Franklin | G02C 7/083 |
| 2019/0285890 A1 | 9/2019 | Lam et al. | |
| 2019/0339516 A1 | 11/2019 | Zhang | |
| 2019/0392830 A1 | 12/2019 | Abdollahian | |
| 2020/0074961 A1* | 3/2020 | Yu | G09G 5/377 |
| 2020/0225114 A1 | 7/2020 | Yang et al. | |
| 2022/0083134 A1* | 3/2022 | Kassner | G06F 3/013 |

\* cited by examiner

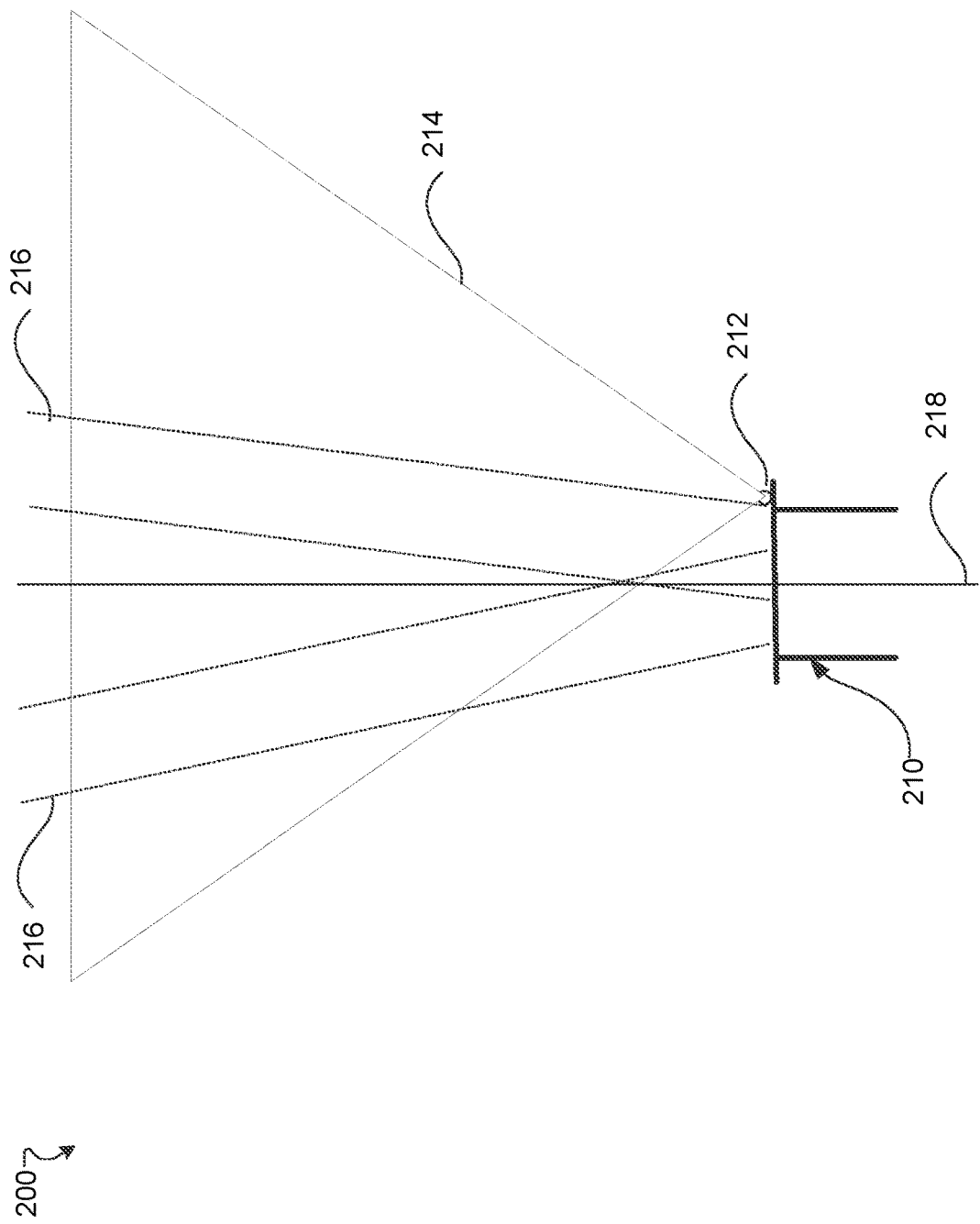

REDUCING LIGHT LEAKAGE VIA EXTERNAL GAZE DETECTION

TECHNICAL FIELD

This description relates to a user viewing sensitive content on a transparent display in an augmented reality system in which leakage from the transparent display may be seen by other individuals.

BACKGROUND

Some augmented reality (AR) systems use smartglasses to display content to a user. Smartglasses are wearable computing devices that that add information alongside or to what the user sees around them. The external environment that may or may not appear in the view of the smartglasses is denoted as a world-side view.

Smartglasses may include at least partially transparent displays in place of lenses in standard glasses. Because the display of some smartglasses may be at least partially transparent, to enable an AR effect a partial mirror may used as part of an optical stack defining the display system.

SUMMARY

In one general aspect, a method can include displaying content on a transparent display for viewing as part of an augmented reality (AR) system by a user on a user side of the transparent display. The method can also include detecting an individual with respect to a world side of the transparent display, the world side of the transparent display being on an opposite side of the transparent display from the user side, the individual being in a state. The method can further include determining whether the state of the individual satisfies a set of criteria, the set of criteria indicating whether the individual can view the content on the world side of the transparent display. The method can further include, in response to the detected individual satisfying the set of criteria, performing an obscuration operation on the displayed content to obscure the content from the individual.

In another general aspect, a computer program product comprising a nontransitive storage medium, the computer program product including code that, when executed by processing circuitry of a computing device, causes the processing circuitry to perform a method. The method can include displaying content on a transparent display for viewing as part of an augmented reality (AR) system by a user on a user side of the transparent display. The method can also include detecting an individual with respect to a world side of the transparent display, the world side of the transparent display being on an opposite side of the transparent display from the user side, the individual being in a state. The method can further include determining whether the state of the individual satisfies a set of criteria, the set of criteria indicating whether the individual can view the content on the world side of the transparent display. The method can further include, in response to the detected individual satisfying the set of criteria, performing an obscuration operation on the displayed content to obscure the content from the individual.

In another general aspect, an electronic apparatus includes a memory and controlling circuitry coupled to the memory. The controlling circuitry is configured to display content on a transparent display for viewing as part of an augmented reality (AR) system by a user on a user side of the transparent display; detect an individual with respect to a world side of the transparent display, the world side of the transparent display being an opposite side of the transparent display from the user side, the individual being in a state; determine whether the state of the individual satisfies a set of criteria, the set of criteria indicating whether the individual can view the content on the world side of the transparent display; and in response to the detected individual satisfying the set of criteria, perform an obscuration operation on the displayed content to obscure the content from the individual.

The details of one or more implementations are set forth in the accompanying drawings and the description below. Other features will be apparent from the description and drawings, and from the claims.

BRIEF DESCRIPTION OF THE DRAWINGS

FIG. 2A is a diagram that illustrates an example field of view (FOV) of a camera of the smartglasses.

DETAILED DESCRIPTION

Figure 1A:
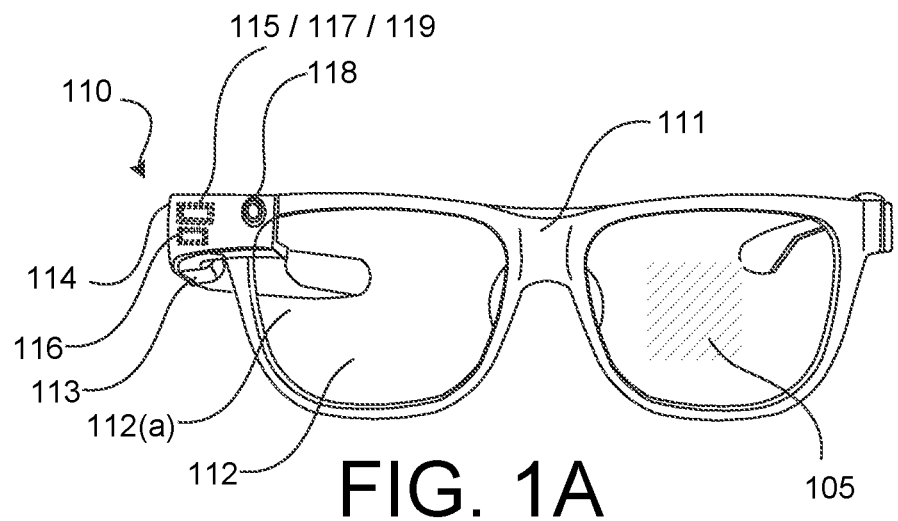
FIG. 1A is a diagram that illustrates example smartglasses used in an augmented reality (AR) system.

Because content is projected onto the display, the optical stack of conventional smartglasses may project light into the world side, i.e., the external environment. Some of that content may be seen by individuals in various positions and at various gaze angles in the vicinity of the world side of a transparent display of the smartglasses. A technical problem with conventional smartglasses is that the conventional smartglasses may allow an individual to see content displayed on a user's smartglasses. Such an allowance may represent a serious security risk, especially in cases where the content includes personally identifiable information (PII) of the user.

In contrast to the conventional approaches to solving the above-described technical problem, a technical solution to the above-described technical problem includes detecting an individual present with respect to a world side, i.e., facing away from a user of a transparent display, opposite side of the transparent display as the user side. For example, a user of an AR system may review a document displayed on the transparent display of wearable smartglasses. The document may be seen in conjunction with objects in the vicinity of the world side of the transparent display. Meanwhile, circuitry connected to the smartglasses detects the presence of an individual in the vicinity of the world side of the transparent display. In response, the circuitry causes an image of the individual to be generated and, based on the image, the circuitry classifies the individual as being in a state satisfying a set of criteria or not; for example, being in a position with respect to the world side of the transparent display at which the individual is able or is not able to see the document through the transparent display. In some implementations, the set of criteria include the individual being oriented in such a way as to be able to see the document. In response to the individual satisfying the criteria, the circuitry obscures the document from the view of the individual.

A technical advantage of the above-described technical solution is that the technical solution better protects the privacy of the user by obscuring private content from the detected individual if that individual satisfies the set of criteria. For example, the above-described circuitry may simply remove the content from the display. Alternatively, the circuitry may move the content to another area of the display deemed not visible to the individual, or simply replace the content with obfuscated content. Moreover, the technical solution may work in near-real-time so that, when the detected individual moves in the vicinity of the world side of the transparent display and is determined to no longer satisfy the set of criteria, then the content may be restored on the display.

In some implementations, determining whether the individual satisfies the set of criteria includes generating image data representing an image of the individual; operating on the image data to produce a value of a parameter, the parameter representing a position and/or orientation of the individual with respect to the world side of the transparent display; and determining whether the value of the parameter is within a specified range.

In some implementations, the state of the individual includes a position with respect to the world side of the transparent display, and the set of criteria includes whether the position is in a particular region outside of the transparent display. In some implementations, the state of the individual includes an orientation with respect to an axis of the transparent display, and the set of criteria includes the orientation being within a particular angular range. In some implementations, the state of the individual includes a gaze angle of eyes of the individual, and the set of criteria includes the gaze angle of the eyes of the individual being within a particular angular range.

In some implementations, operating on the image data includes inputting the image data into a classification engine configured to classify the image data as one of indicating the individual is able to view the content or indicating the individual is not able to view the content.

In some implementations, the method further includes training the classification engine, including acquiring training image data, the training image data representing (i) a plurality of images, each of the plurality of images including an image of a sample individual of a population of sample individuals, the sample individual in the image having a position the world side of the world side of the transparent display, and (ii) a plurality of binary classification values being one of indicating the individual is able to view the content or indicating the individual is not able to view the content; and optimizing a loss function based on the training image data to produce the classification engine.

In some implementations, the method further includes training the classification engine, including acquiring training image data, the training image data representing (i) a plurality of images, each of the plurality of images including an image of a sample individual of a population of sample individuals, the sample individual in the image having an orientation with respect to an axis of the transparent display, and (ii) a plurality of binary classification values being one of indicating the individual is able to view the content or indicating the individual is not able to view the content; and optimizing a loss function based on the training image data to produce the classification engine.

In some implementations, the method further includes training the classification engine, including acquiring training image data, the training image data representing (i) a plurality of images, each of the plurality of images including an image of a sample individual of a population of sample individuals, eyes of the sample individual in the image having a gaze angle with respect to an axis of the transparent display, and (ii) a plurality of binary classification values being one of indicating the individual is able to view the content or indicating the individual is not able to view the content; and optimizing a loss function based on the training image data to produce the classification engine.

In some implementations, the content is displayed in a first region of the transparent display. In such implementations, performing the obscuration operation on the displayed content includes removing the content from the first region; and displaying the content in a second region of the transparent display, the individual not satisfying the set of criteria when the content is displayed in the second region of the transparent display when the individual is at the position.

In some implementations, the content is projected onto the user side of the transparent display while the transparent display simultaneously admits light from the world side to illuminate the user side of the display.

In some implementations, detecting the individual with respect to the world side of the transparent display includes receiving indication data representing an indication of the presence of the individual in a vicinity of world side of the transparent display. In some implementations, the indication data includes audio data representing an audio signal. In some implementations, the content is first content, and the first content is displayed in a first region of the transparent display; in some implementations, receiving the indication data includes rendering the indication data to produce second content, the second content being displayed in a second region of the transparent display. In some implementations, receiving the indication data includes rendering the indication data to produce second content, the second content being displayed in a second color on the transparent display. In some implementations, the indication data indicates that the individual has a camera and a lens of the camera is pointed toward the transparent display. In some implementations, the indication data indicates that the individual has moved their head toward the transparent display.

FIG. 1A is a diagram that illustrates example smartglasses 110 used in an augmented reality (AR) system as a head. FIG. 1A shows a world side 112(*a*) of a transparent display 112 of the smartglasses 110. The smartglasses 110 may be used as a head-mounted display (HMD) within an AR system. The smartglasses 110 include a frame 111, with a transparent display 112 coupled in the frame 111. In some implementations, an audio output device 113 is coupled to the frame 111. In some implementations, a touch surface 114 allows for user control, input and the like of the smartglasses 110. The smartglasses 110 may include a sensing system 116 including various sensing system devices and a control system 117 including various control system devices to facilitate operation of the smartglasses 110. The control system 117 may include a processor 119 operably coupled to the components of the control system 117 and a communication module 115 providing for communication with external devices and/or networks. The smartglasses 110 may also include an image sensor 118 (i.e., a camera 118), a depth sensor, a light sensor, and other such sensing devices. In some implementations, the image sensor 118, or camera 118 is capable of capturing still and/or moving images, patterns, features, light and the like.

It is noted that, in some implementations, the smartglasses 110 may be replaced with any sort of HMD that includes a transparent display, in which the form of the HMD is not necessarily wearable glasses or goggles. For example, one such HMD may take the form of a camera with a viewfinder configured to display AR content and allow viewing of the world-side environment.

Figure 1B:
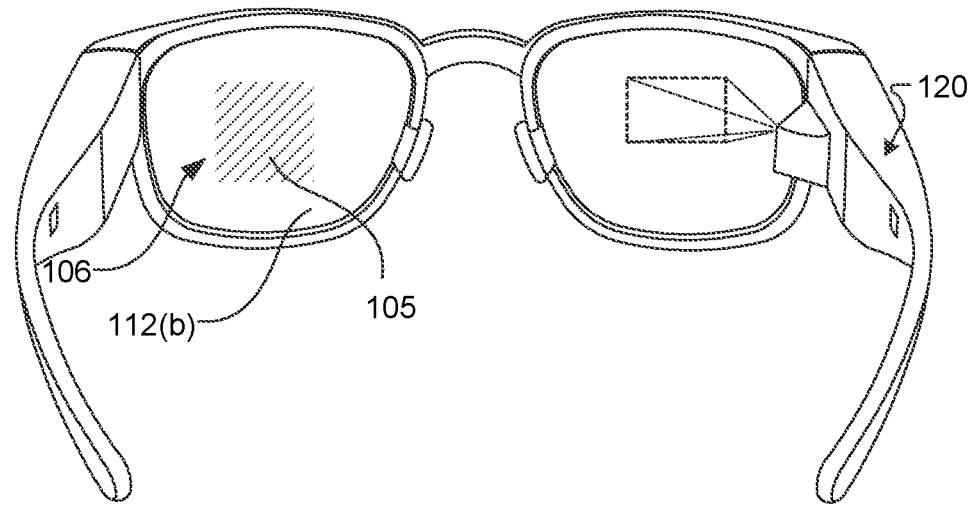
FIG. 1B is a diagram that illustrates example content displayed on a transparent display of the smartglasses.

FIG. 1B is a diagram that illustrates example content 105 displayed on a user side 112(b) of the transparent display 112 of the smartglasses 110. As shown in FIG. 1B, the content appears in a region 106 of the user side 112(b) of the transparent display 112. It is noted that the content 105 also appears, albeit with far less contrast, visible to the world side 112(a) of the transparent display 112 due to light leakage from the transparent display 112.

Figure 1C:
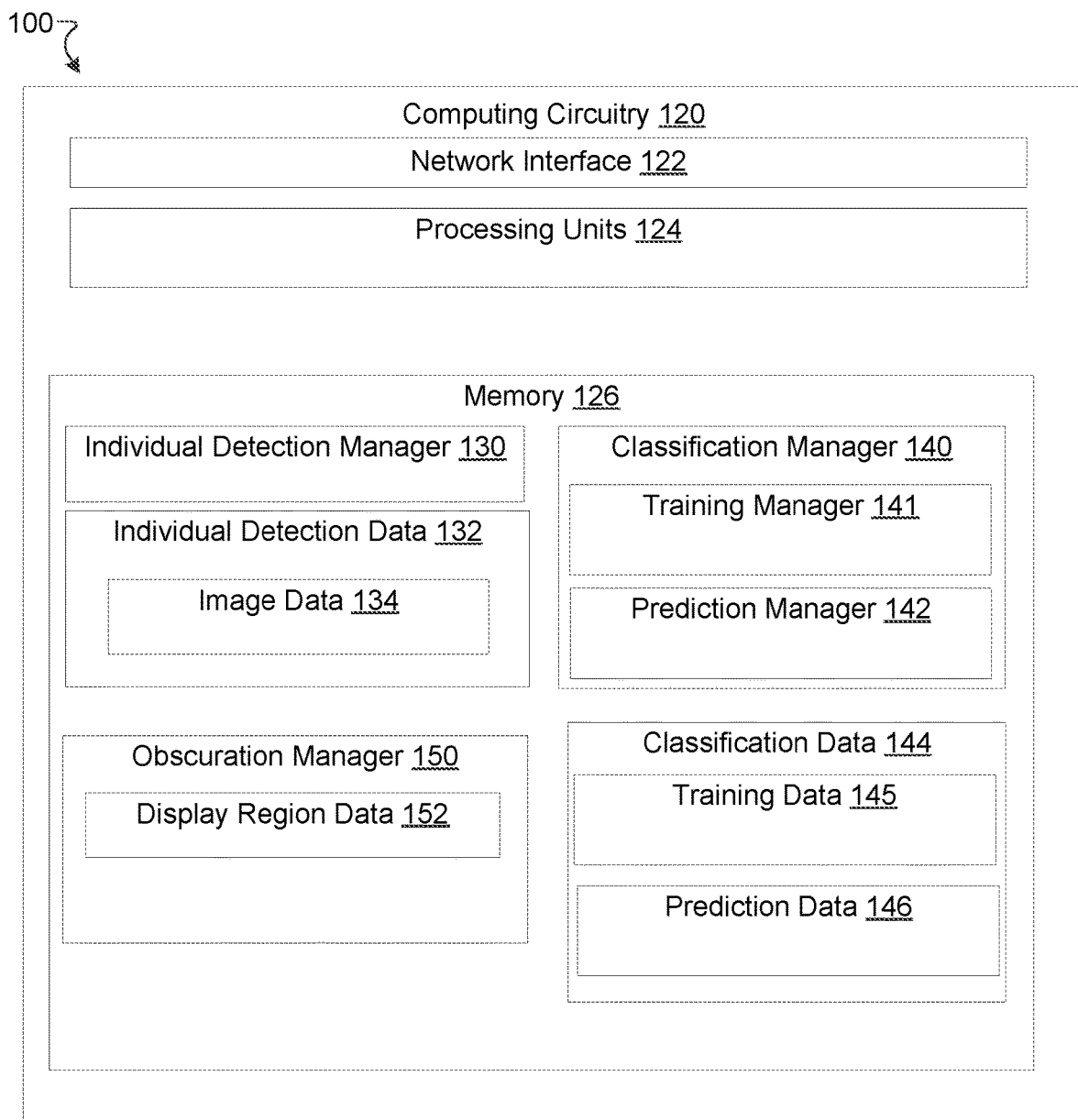
FIG. 1C is a diagram that illustrates an example electronic environment for implementing the technical solution described herein.

FIG. 1B also illustrates computing circuitry 120 used to make the determination of whether a detected individual meets a set of criteria, i.e., can the individual see the content 105? The computing circuitry 120 is described in detail with regard to FIG. 1C. In some implementations, however, the computing circuitry is located external to the smartglasses 110. For example, the computing circuitry 120 may be located in a smartphone connected to the smartglasses.

FIG. 1C is a diagram that illustrates an example electronic environment 100 in which the above-described improved techniques may be implemented. As shown in FIG. 1C, the example electronic environment 100 includes computing circuitry 220.

The computing circuitry 120 includes a network interface 122, one or more processing units 124, and memory 126. The network interface 122 includes, for example, adaptors for converting electronic and/or optical signals received from a network to electronic form for use by the computing circuitry 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computing circuitry 120 can include processors (e.g., processing units 124) configured to process instructions stored in the memory 126. Examples of such instructions as depicted in FIG. 1C include an individual detection manager 130, a classification manager 140, and an obscuration manager 250. Further, as illustrated in FIG. 1C, the memory 126 is configured to store various data, which is described with respect to the respective managers that use such data.

The individual detection manager 130 is configured to perform a detection operation to detect human individuals in the world side of the transparent display. In some implementations, the detection of an individual is performed when the individual is in the field of view (FOV) of a camera, e.g., camera 118 in FIG. 1A, associated with a transparent display for, e.g., smartglasses in an AR system, to produce individual detection data 132. For example, the camera may produce images of the world-side environment within its FOV on a continuous or periodic basis. The individual detection manager 130, in some implementations, is configured to detect an object within its FOV by scanning the FOV and receiving a reflection of a scanning beam in return. In some implementations, the individual detection manager 130 is configured to employ a computer vision algorithm to determine whether the detected object is a human individual.

In some implementations, the individual detection manager 130 is configured to generate an indication (i.e., indication data) in response to detecting an individual in the FOV of the camera of the transparent display (i.e., the FOV of the transparent display). In some implementations, the indication is visual. In some implementations, a visual indication takes the form of light from an LED. In some implementations, a visual indication takes the form of a change in color of displayed content. In some implementations, a visual indication takes the form of additional content displayed on the transparent display. In some implementations, the indication includes an audio signal to be played from a speaker associated with the transparent display, e.g., audio output device 113 in FIG. 1A.

In some implementations, in addition to generating an indication, the individual detection manager 130 is configured to generate image data representing a scene in the world-side of the transparent display that includes the detected individual. In some implementations, the scene takes the form of a vicinity of the individual; such a scene indicates, for example, the position and orientation of the detected individual with respect to the FOV and the camera. In some implementations, the scene takes the form of a closeup shot of the detected individual; such a scene indicates, for example, the direction of an eye gaze.

In some implementations, the individual detection manager 130 is configured to detect a head movement of a detected individual within the FOV. A head movement toward the display may indicate an attempt to view the content from the world side of the transparent display. The detection, in some implementation, involves comparing consecutive frames of video feed from the camera.

The individual detection data 132 represents results of the detection of individuals in the vicinity of the world side of the transparent display. For example, the individual detection data 132 includes data related to providing indications, visual, audio, and otherwise. As shown in FIG. 1C, the individual detection data 132 also includes image data 134.

In some implementations, the image data 134 represents an image of the vicinity of the world side of the transparent display in the FOV and the surrounding environment. In some implementations, the image data 134 is only stored in memory when there is a detection of an individual in the vicinity of world side of the transparent display. In some implementations, the image data 134 represents an image of an individual in the FOV of a camera associated with the transparent display; such an image provides information about the position and orientation of the individual with respect to the FOV and the camera. In some implementations, however, the image data 134 represents a closeup of the individual; such a closeup provides information about an eye gaze direction.

In some implementations, the image data 134 includes video data representing frames of a video taken over a period of time. Such video data may be useful in determining any motion of the individual while in the vicinity of the world side of the transparent display. For example, using such video data, the individual detection manager 130 may compare frames to verify whether a detected individual has moved their head. In this way, even though the individual may not be at a position or orientation to see the content initially on the transparent display, the individual may be trying to view the content by adjusting their gaze angle.

The classification manager 140 is configured to determine whether a detected individual satisfies a set of criteria and hence produce classification data 144; the set of criteria is indicative of whether the individual can see content on the transparent display from the world side.

In some implementations, the classification manager 140 is configured to input image data 134 into a neural network, e.g., a convolutional neural network (CNN) having a specified number of layers, to produce classification data 144. Such a neural network is configured to produce a classification result: whether a detected individual in an image represented by the image data 124 satisfies a set of criteria. In some implementations, the classification result indicates whether the detected individual is able to view content in a region of the transparent display. In such implementations, the classification manager includes a training manager 141 and a prediction manager 142.

The training manager 141 is configured to generate a classification engine, i.e., a neural network, based on training data 145. For example, in some implementations the training data 145 represents images of individuals in the vicinity of the world side of the transparent display and corresponding indicators indicating whether or not individuals are able to see the content on the transparent display. The training manager 141 then adjusts weights of nodes within hidden layers of the neural network to optimize a specified loss function. In some implementations, a loss function correlates face size with distance, enabling the classification engine to estimate a bystander position relative to the world side sensitive view cone generated by the display. In some implementations, the classification engine learns the calibration between the camera view cone and display's world side sensitive view cone; further details are shown with regard to FIGS. 3A-3C. The weights adjusted by the training manager 141 and other data representing an architecture of the neural network are included in the classification data 144.

The prediction manager 142 is configured to classify an image represented by image data 134 as including an individual that is able to view content on the transparent display, or not. As shown in FIG. 1C, the classification data 144 includes prediction data 146 output from the prediction manager 142; the prediction data 146 represents prediction results corresponding to image data 134.

In some implementations, the classification manager 140 is configured to produce the classification data based on a lookup table. For example, a lookup table, in some implementations, has fields representing identifiers of regions in the vicinity of the world side of the transparent display and on the user side of the transparent display, orientation angle, gaze angle, and the like. In this case, the classification manager 140 is configured to extract values of these fields based on the image data 134. The prediction data 146 then indicates whether the lookup table indicates whether the set of criteria have been satisfied.

The obscuration manager 150 is configured to obscure the content from an individual that has been classified as satisfying the criteria, i.e., is able to view the content on the transparent display while in the vicinity of the world side of the transparent display. In some implementations, the obscuration manager 150, in response to an individual being classified as satisfying the set of criteria, removes the content from the transparent display. In some implementations, the obscuration manager 150, in response to an individual being classified as satisfying the set of criteria, reduces a contrast of the content to a point where the content may no longer be seen by the individual.

In some implementations, the obscuration manager 150, in response to an individual being classified as satisfying the set of criteria, moves the content to a region of the display that is determined to not be seen by the individual. In this case, in some implementations one defines of the transparent display in which content may be displayed. For example, if content displayed in a first region of the transparent display is able to be viewed by an individual, then the obscuration manager may move the content to a second region in which it has been determined that the individual may not see the content. In some implementations, the determination is made via a lookup table. In some implementations, the determination is made via a classification engine as described above.

FIG. 2A is a diagram that illustrates a top view of an example world side environment 200 including a field of view (FOV) 214 of a camera 212 of smartglasses 210, the smartglasses 210 having an axis 218. As shown in FIG. 2A, the world side environment 200 is in the vicinity of the world side of the smartglasses 210. The FOV 214 is represented in FIG. 2A as a triangular region as seen from above. In some implementations, the FOV 214 covers an area in the world-side environment 200 that has a shape other than a triangle, e.g., bounded by curves such as circular arcs, parabolic arcs, or the like. In some implementations, the computing circuitry 120 stores information about the FOV 214 including its shape and extent into the world-side environment 200. In some implementations, the computing circuitry 120 determines the shape and extent of the FOV 214 based on camera parameters as well as an orientation of the user's body and head.

Also shown in FIG. 2A are lines that denote a boundary of a region 216 defining the leakage of light from the transparent display 210. Any content displayed on the transparent display 210 is projected within the region 216. Depending on an individual's position, orientation, and eye gaze angle, the individual may see content in the region 216.

Figure 2B:
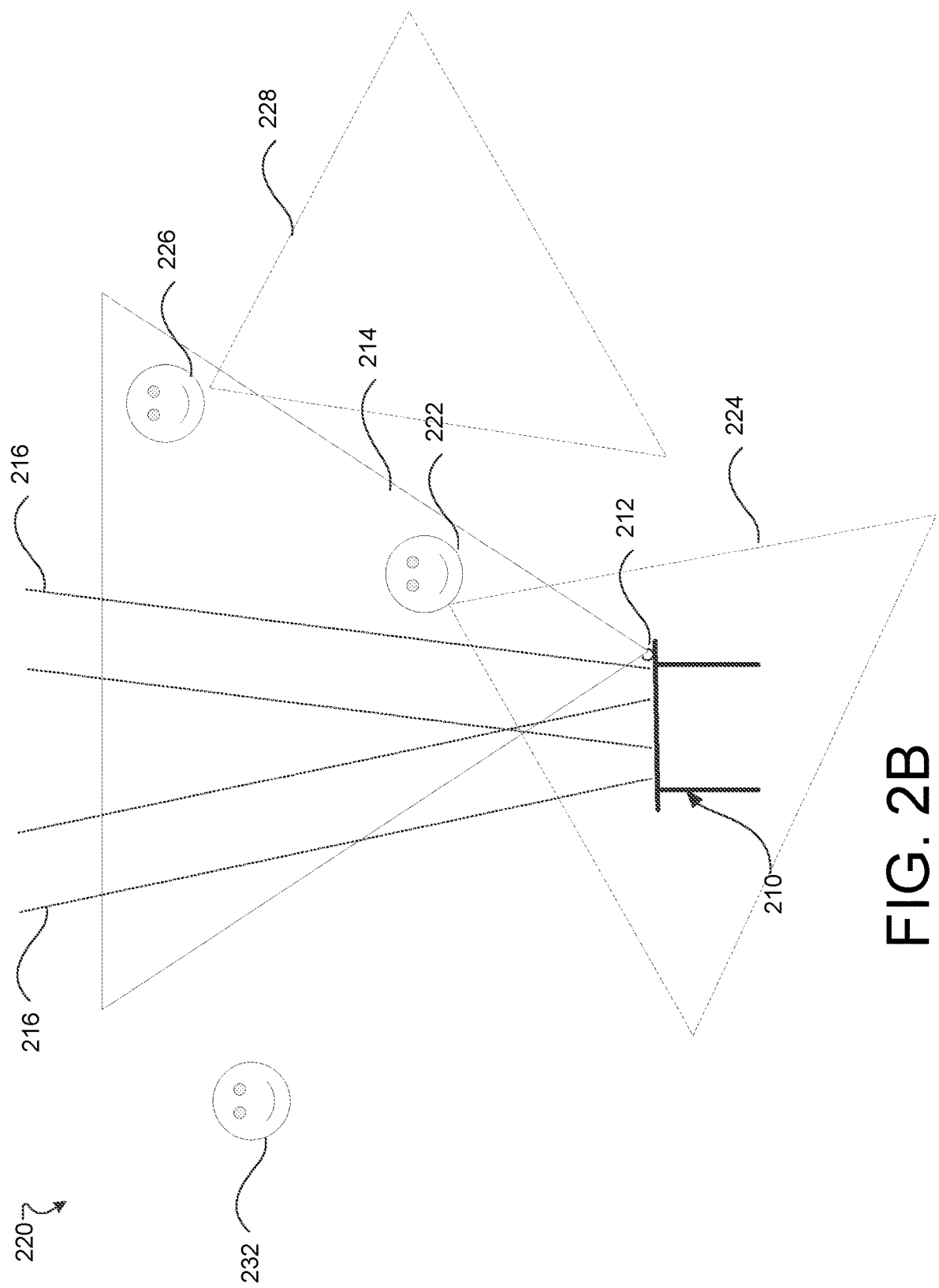
FIG. 2B is a diagram that illustrates an example scenario in which individuals on the world side of the AR system cannot see the content displayed on the transparent display of the smartglasses.

FIG. 2B is a diagram that illustrates top view of an example world-side environment 200 including a FOV 214 of a camera 212 of smartglasses 210. As shown in FIG. 2B, there are three individuals in the world-side environment 200: individual 222, individual 226, and individual 232. In FIG. 2B, each individual 222, 226, and 232 cannot view content on the smartglasses 210. For example, individual 222 may be classified as not being able to view content on the smartglasses 210 because, even though the individual 222 has a FOV 224 directed toward the smartglasses 210, the individual 222 is not at an appropriate incident angle with respect to the axis 218 to see any region on the transparent display of the smartglasses 210. Individual 226 is at the edge of the FOV 214 and has a FOV 228 directed away from the smartglasses 210 and will not be able to view any content on the transparent display. Individual 232 is not in the FOV and is accordingly not detectable by the camera 212.

Figure 2C:
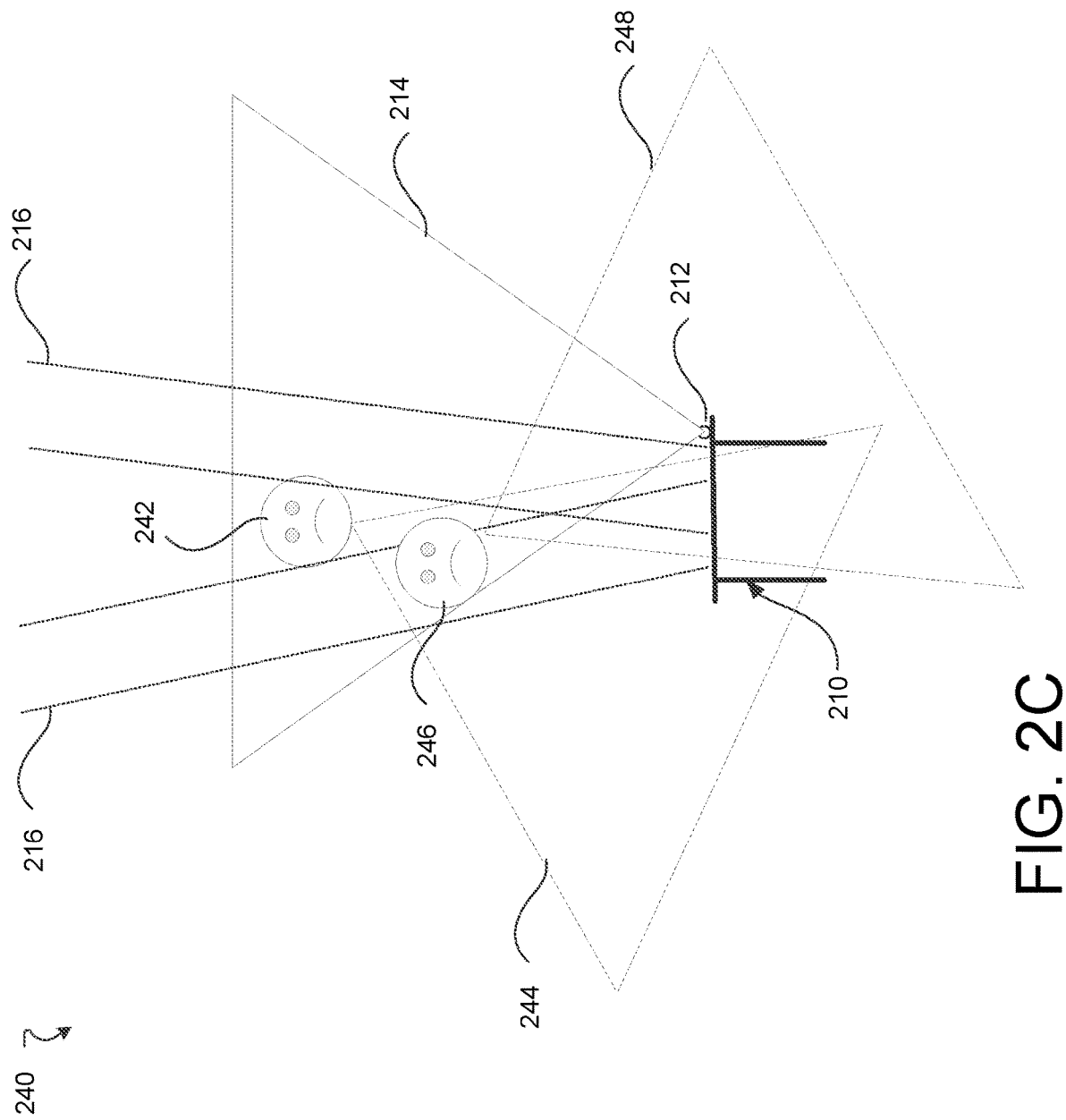
FIG. 2C is a diagram that illustrates an example scenario in which individuals on the world side of the AR system may see the content displayed on the transparent display of the smartglasses.

FIG. 2C is a diagram that illustrates an example scenario in which individuals on the world side of the AR system may see the content displayed on the transparent display of the smartglasses. As shown in FIG. 2C, there are two individuals in the world-side environment 200: individual 242 and individual 246. Individual 242 is classified as being able to view the content on a region of the transparent display—the left portion—because the individual 242 has a FOV 244 that results from a gaze in that direction with respect to the axis 218. Individual 246 is also classified as being able to view the content on the left portion of the transparent display because the FOV 248 of individual 246 allows the individual 246 to see reflections from that portion of the transparent display.

Figure 3A:
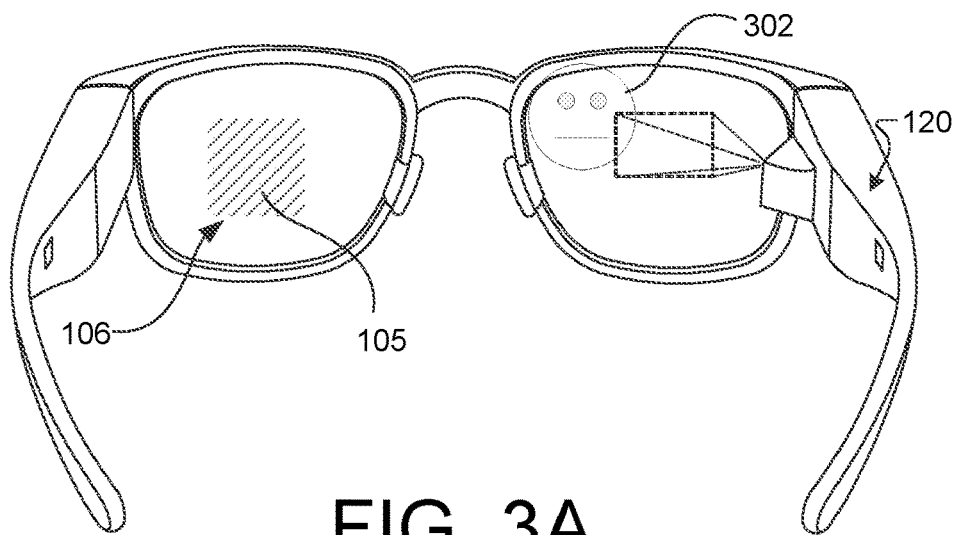
FIG. 3A is a diagram that illustrates an example scenario in which an individual on the world side of the AR system is detected by circuitry in the smartglasses.

FIG. 3A is a diagram that illustrates an example scenario in which an individual 302 in the vicinity of the world side of smartglasses 110 is detected by circuitry 120 in the smartglasses 110. As shown in FIG. 3A, there is content 105 in a region 106 of the user side of the transparent display of the smartglasses 110.

Figure 3B:
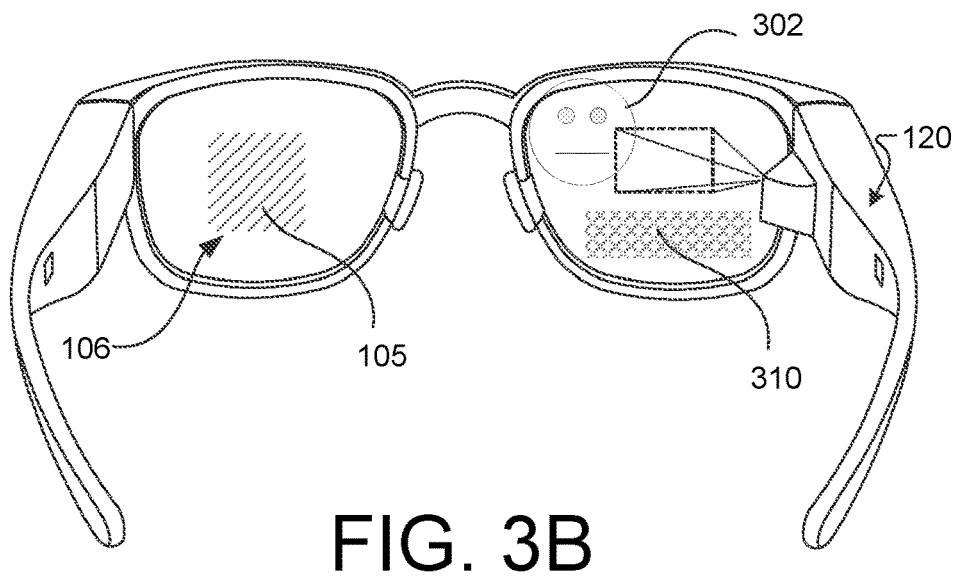
FIG. 3B is a diagram that illustrates a notification that an individual has been detected in the world side of the AR system.

FIG. 3B is a diagram that illustrates a notification 310 that the individual 302 has been detected in the vicinity of the world side of the smartglasses 110. As shown in FIG. 3B, the notification 310 is a visual notification in a different region of the transparent display. In some implementations, the notification 310 is instead located in a light from an LED mounted on the smartglasses 110. In some implementations, the notification 310 instead takes the form of an audio signal emitted by a speaker in the smartglasses 110.

Figure 3C:
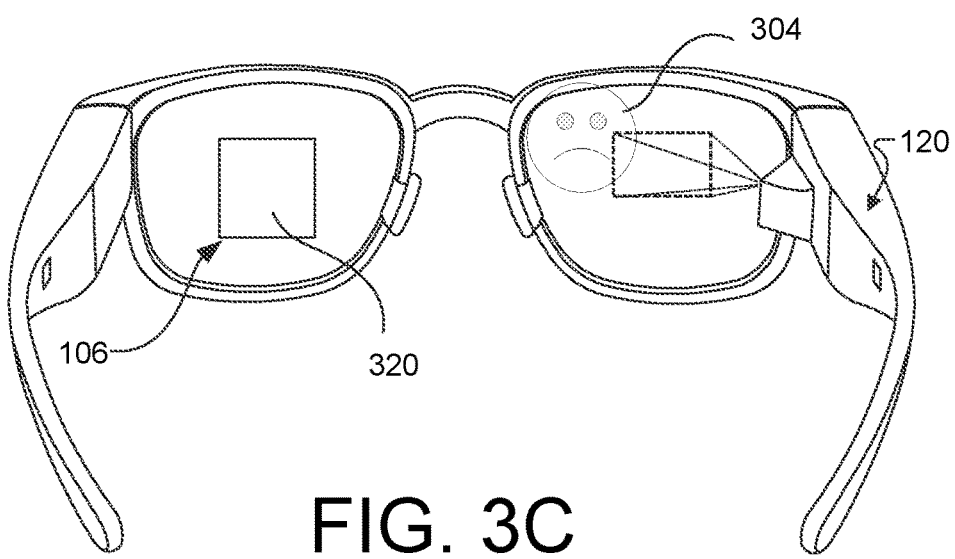
FIG. 3C is a diagram that illustrates an obscuration of the content displayed on the transparent display of the smartglasses due to a determination that a detected individual mat be able to see the content.

FIG. 3C is a diagram that illustrates an obscuration 320 of the content displayed on the transparent display of the smartglasses 110 due to a determination that a detected individual 304 may be able to see the content 105. As shown in FIG. 3C, the obscuration 320 takes the form of a removal of the content 105 from the transparent display of the smartglasses 110. In some implementations, the obscuration 320 takes the form of a relocation of the content 105 to a different region of the transparent display; the different region is chosen so that the individual 304 cannot see the content 105 in the new location.

Figure 4:
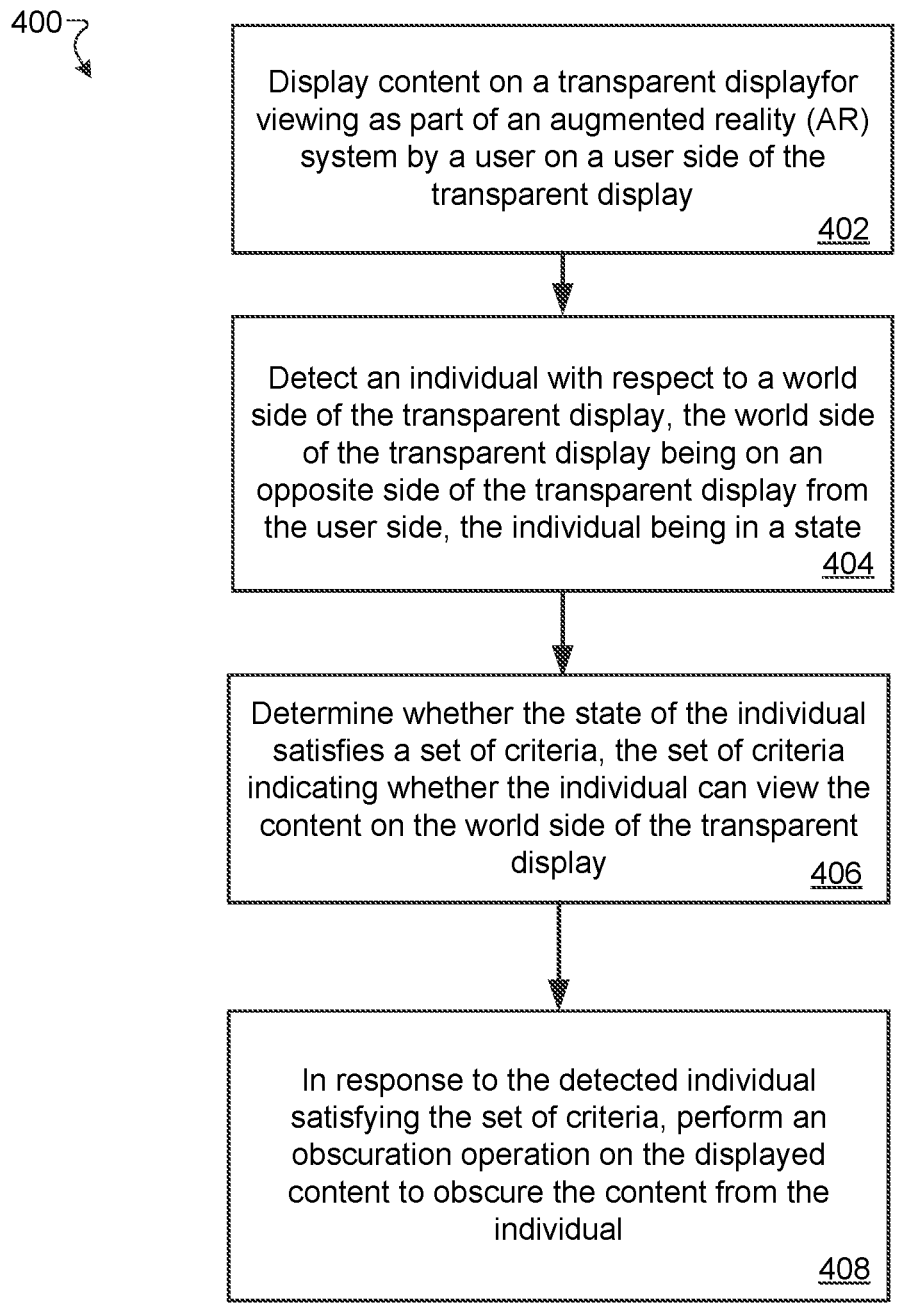
FIG. 4 is a flow chart that illustrates an example process for obscuring content from individuals in a world side of an AR system according to the technical solution.

FIG. 4 is a flow chart depicting an example method 400 of obscuring content from individuals in a world side of an AR system. The method 400 may be performed by software constructs described in connection with FIG. 1C, which reside in memory 126 of the computing circuitry 120 and are run by the set of processing units 124 or may be performed by software constructs which reside in memory of the computing circuitry 120.

At 402, the computing circuitry 120 displays content (e.g., content 105) on a transparent display (e.g., transparent display 112 of smartglasses 110) for viewing as part of an augmented reality (AR) system by a user on a user side (e.g., user side 112(b)) of the transparent display.

At 404, the individual detection manager 130 detects an individual with respect to a world side (e.g., world side 112(b)) of the transparent display, the world side of the transparent display being on an opposite side of the transparent display from the user side, the individual being in a state.

At 406, the individual detection manager 130 determines whether the state of the individual satisfies a set of criteria, the set of criteria indicating whether the individual can view the content on the world side of the transparent display.

In some implementations, the set of criteria includes an orientation of the individual with respect to an axis of the transparent display being within a particular angular range. In some implementations, the axis of the transparent display is oriented normal to the transparent display. In some implementations, the axis is directed toward the world-side of the transparent display.

In some implementations, the set of criteria includes a gaze angle of eyes of the individual being within a particular angular range.

In some implementations, the classification manager 140 classifies individuals as satisfying the set of criteria or not; in effect, the classification is whether the individuals can or cannot view the content.

At 408, in response to the detected individual satisfying the set of criteria, the obscuration manager 150 performs an obscuration operation on the displayed content to obscure the content from the individual, in some implementations as shown in FIG. 3C.

Figure 5:
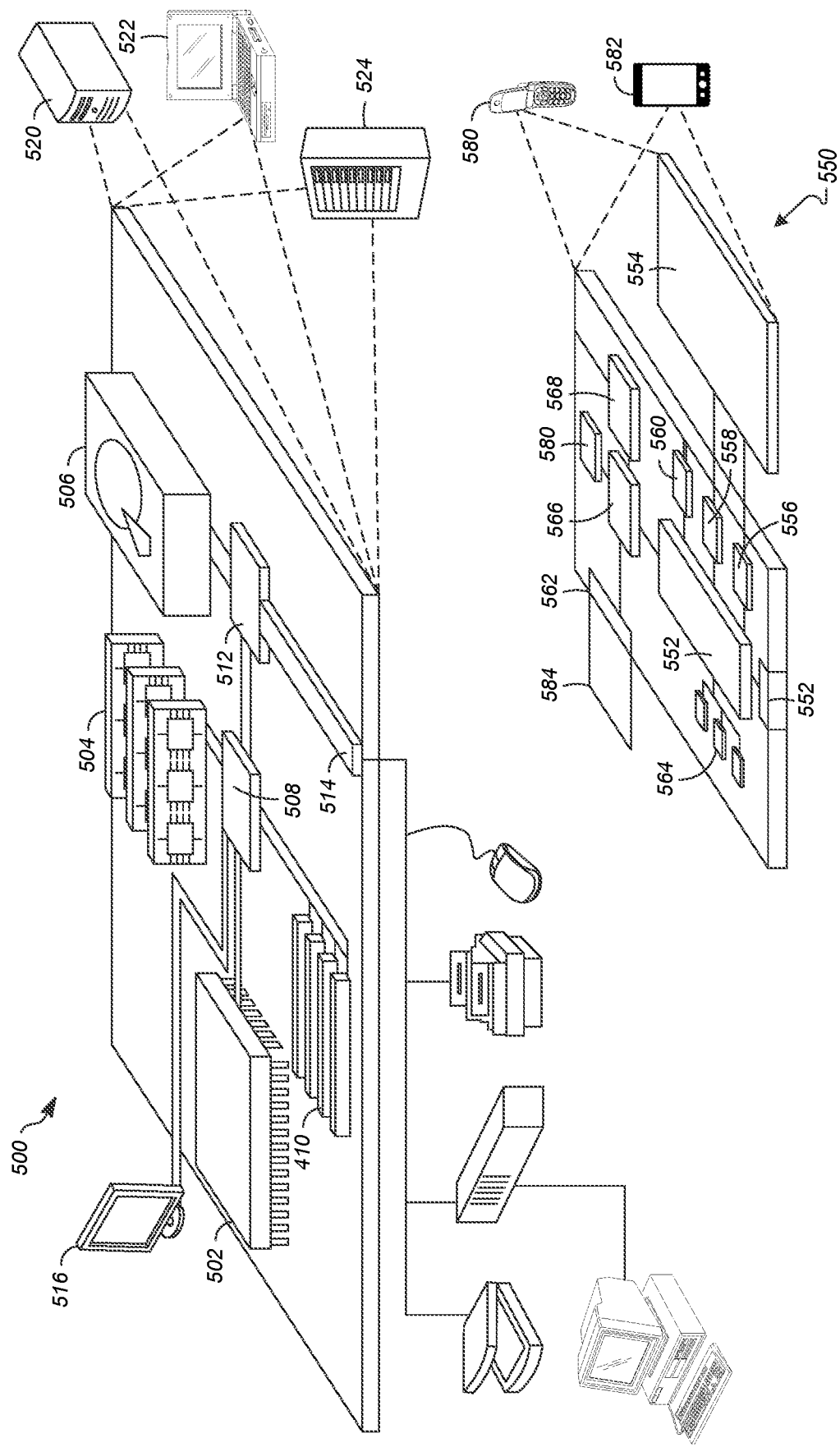
FIG. 5 illustrates an example of a computer device and a mobile computer device that can be used with circuits described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 450, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Returning to FIG. 2, in some implementations, the memory 226 can be any type of memory such as a random-access memory, a disk drive memory, flash memory, and/or so forth. In some implementations, the memory 226 can be implemented as more than one memory component (e.g., more than one RAM component or disk drive memory) associated with the components of the computing circuitry 220. In some implementations, the memory 226 can be a database memory. In some implementations, the memory 226 can be, or can include, a non-local memory. For example, the memory 226 can be, or can include, a memory shared by multiple devices (not shown). In some implementations, the memory 226 can be associated with a server device (not shown) within a network and configured to serve the components of the computing circuitry 220.

The components (e.g., modules, processing units 224) of the compression computer 120 can be configured to operate based on one or more platforms (e.g., one or more similar or different platforms) that can include one or more types of hardware, software, firmware, operating systems, runtime libraries, and/or so forth. In some implementations, the components of the computing circuitry 220 can be configured to operate within a cluster of devices (e.g., a server farm). In such an implementation, the functionality and processing of the components of the computing circuitry 220 can be distributed to several devices of the cluster of devices.

The components of the computing circuitry 220 can be, or can include, any type of hardware and/or software configured to process attributes. In some implementations, one or more portions of the components shown in the components of the computing circuitry 220 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computing circuitry 220 can be, or can include, a software module configured for execution by at least one processor (not shown). In some implementations, the functionality of the components can be included in different modules and/or different components than those shown in FIG. 3.

Although not shown, in some implementations, the components of the computing circuitry 220 (or portions thereof) can be configured to operate within, for example, a data center (e.g., a cloud computing environment), a computer system, one or more server/host devices, and/or so forth. In some implementations, the components of the computing circuitry 220 (or portions thereof) can be configured to operate within a network. Thus, the components of the computing circuitry 220 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the computer 120 can be, or can include, processors configured to process instructions stored in a memory. For example, the EM radiation manager 230 (and/or a portion thereof), the foreground extraction manager 240 (and/or a portion thereof), and the machine learning manager 250 (and/or a portion thereof) can be a combination of a processor and a memory configured to execute instructions related to a process to implement one or more functions.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    displaying content on a transparent display for viewing as part of an augmented reality (AR) system by a user on a user side of the transparent display;
    detecting an individual with respect to a world side of the transparent display, the world side of the transparent display being on an opposite side of the transparent display from the user side;
    generating image data representing an image of the individual;
    operating on the image data to produce a value of a parameter;
    determining whether the value of the parameter is within a specified range; and
    in response to the value of the parameter being within the specified range, performing an obscuration operation on the content on the transparent display to obscure the content, from the individual, on the transparent display.

2. The method as in claim 1, wherein the value of the parameter includes a position with respect to the world side of the transparent display.

3. The method as in claim 1, wherein the value of the parameter includes an orientation with respect to an axis of the transparent display.

4. The method as in claim 1, wherein the value of the parameter includes a gaze angle of eyes of the individual.

5. The method as in claim 1, wherein operating on the image data includes:
    inputting the image data into a classification engine configured to classify the image data as one of indicating the individual is able to view the content or indicating the individual is not able to view the content.

6. The method as in claim 5, further comprising training the classification engine, including:
    acquiring training image data, the training image data representing (i) a plurality of images, each of the plurality of images including an image of a sample individual of a population of sample individuals, the sample individual in the image having a position the world side of the world side of the transparent display, and (ii) a plurality of binary classification values being one of indicating the individual is able to view the content or indicating the individual is not able to view the content; and
    optimizing a loss function based on the training image data to produce the classification engine.

7. The method as in claim 5, further comprising training the classification engine, including:
    acquiring training image data, the training image data representing (i) a plurality of images, each of the plurality of images including an image of a sample individual of a population of sample individuals, the sample individual in the image having an orientation with respect to an axis of the transparent display, and (ii) a plurality of binary classification values being one of indicating the individual is able to view the content or indicating the individual is not able to view the content; and
    optimizing a loss function based on the training image data to produce the classification engine.

8. The method as in claim 5, further comprising training the classification engine, including:
    acquiring training image data, the training image data representing (i) a plurality of images, each of the plurality of images including an image of a sample individual of a population of sample individuals, eyes of the sample individual in the image having a gaze angle with respect to an axis of the transparent display, and (ii) a plurality of binary classification values being one of indicating the individual is able to view the content or indicating the individual is not able to view the content; and
    optimizing a loss function based on the training image data to produce the classification engine.

9. The method as in claim 1, wherein the content is displayed in a first region of the user side of the transparent display; and
    wherein performing the obscuration operation on the content includes:
        removing the content from the first region; and
        displaying the content in a second region of the user side of the transparent display, the value of the parameter not being in the specified range when the content is displayed in the second region of the user side of the transparent display.

10. A computer program product comprising a non-transitory storage medium, the computer program product including instructions that, when executed by processing circuitry, causes the processing circuitry to perform a method, the method comprising:
    displaying content on a transparent display for viewing as part of an augmented reality (AR) system by a user on a user side of the transparent display;
    detecting an individual with respect to a world side of the transparent display, the world side of the transparent display being on an opposite side of the transparent display from the user side;

generating image data representing an image of the individual;

operating on the image data to produce a value of a parameter;

determining whether the value of the parameter is within a specified range; and in response to the value of the parameter being within the specified range, performing an obscuration operation on the content on the transparent display to obscure the content, from the individual, on the transparent display.

11. The computer program product as in claim 10, wherein the content is projected onto the user side of the transparent display while the transparent display simultaneously admits light from the world side to illuminate the user side of the transparent display.

12. The computer program product as in claim 10, wherein detecting the individual with respect to the world side of the transparent display includes:

receiving indication data representing an indication of a presence of the individual in a vicinity of world side of the transparent display.

13. The computer program product as in claim 12, wherein the indication data includes audio data representing an audio signal.

14. The computer program product as in claim 12, wherein the content is first content, and the first content is displayed in a first region of the user side of the transparent display, and wherein receiving the indication data includes:

rendering the indication data to produce second content, the second content being displayed in a second region of the user side of the transparent display.

15. The computer program product as in claim 12, wherein the content is first content, and the first content is displayed in a first color on the user side of the transparent display, and wherein receiving the indication data includes:

rendering the indication data to produce second content, the second content being displayed in a second color on the user side of the transparent display.

16. The computer program product as in claim 12, wherein the indication data indicates that the individual has a camera and a lens of the camera is pointed toward the transparent display.

17. The computer program product as in claim 12, wherein the indication data indicates that the individual has moved their head toward the transparent display.

18. An electronic apparatus, the electronic apparatus comprising:

memory; and controlling circuitry coupled to the memory, the controlling circuitry being configured to:

display content on a transparent display for viewing as part of an augmented reality (AR) system by a user on a user side of the transparent display;

detect an individual with respect to a world side of the transparent display, the world side of the transparent display being an opposite side of the transparent display from the user side;

generate image data representing an image of the individual;

operate on the image data to produce a value of a parameter;

determine whether the value of the parameter is within a specified range; and in response to the value of the parameter being within the specified range, perform an obscuration operation on the content on the transparent display to obscure the content, from the individual, on the transparent display.

19. The electronic apparatus as in claim 18, wherein the controlling circuitry is further configured to generate image data representing images of objects in a vicinity of the world side of the transparent display, and wherein the controlling circuitry configured to operate on the image data is further configured to:

input the image data into a classification engine configured to classify the image data as one of indicating the individual is able to view the content or indicating the individual is not able to view the content.

* * * * *